United States Patent
Chen

(10) Patent No.: US 10,553,053 B2
(45) Date of Patent: Feb. 4, 2020

(54) BIOMETRIC FUSION ELECTRONIC LOCK SYSTEM

(71) Applicant: Jeff Chen, Chiayi (TW)

(72) Inventor: Jeff Chen, Chiayi (TW)

(*) Notice: Subject to any disclaimer, the term of this patent is extended or adjusted under 35 U.S.C. 154(b) by 0 days.

(21) Appl. No.: 15/997,797

(22) Filed: Jun. 5, 2018

(65) Prior Publication Data

US 2019/0371099 A1    Dec. 5, 2019

(51) Int. Cl.
| | |
|---|---|
| *G07C 9/00* | (2006.01) |
| *G10L 17/00* | (2013.01) |
| *G06K 9/00* | (2006.01) |

(52) U.S. Cl.
CPC ..... *G07C 9/00158* (2013.01); *G06K 9/00268* (2013.01); *G06K 9/00302* (2013.01); *G10L 17/005* (2013.01)

(58) Field of Classification Search
None
See application file for complete search history.

(56) References Cited

U.S. PATENT DOCUMENTS

| | | | | |
|---|---|---|---|---|
| 6,107,935 | A * | 8/2000 | Comerford | G10L 17/06 340/5.52 |
| 9,042,606 | B2 * | 5/2015 | Bebis | G06K 9/00375 382/115 |
| 9,064,145 | B2 * | 6/2015 | Tan | G06K 9/00597 |
| 9,189,686 | B2 * | 11/2015 | Bahjat | G06K 9/00617 |
| 9,342,936 | B2 * | 5/2016 | Scalisi | G07C 9/00087 |
| 9,626,841 | B2 * | 4/2017 | Fadell | G08B 27/003 |

* cited by examiner

*Primary Examiner* — K. Wong
(74) *Attorney, Agent, or Firm* — Alan D. Kamrath; Karin L. Williams; Mayer & Williams

(57) ABSTRACT

A biometric fusion electronic lock system contains a central processing module including an image processing unit, a voice processing unit, a digital signal processing unit, a logic processing unit, and an interface control unit. An image capturing module is electrically connected with the central processing module. A voice capturing module is electrically connected with the central processing module. A locking/unlocking module is configured to drive a locking latchbolt to lock or unlock the electronic lock system, and the locking/unlocking module is electrically connected with the central processing module. A storage module is set in a storage media of the electronic lock system so as to store facial features and voiceprint data captured by the image capturing module and the voice capturing module respectively. A liquid-crystal display (LCD) module is electrically connected with an interface control unit of the central processing module.

2 Claims, 4 Drawing Sheets

BIOMETRIC FUSION ELECTRONIC LOCK SYSTEM

BACKGROUND OF THE INVENTION

Field of the Invention

The present invention relates to a biometric fusion electronic lock system which is locked and unlocked by using biometric fusion of face recognition and voiceprint identification.

Description of the Prior Art

A conventional access control, portable electronic device, and mobile payment system are locked and unlocked safely, easily, and reliably. The conventional access control contains an identity verification system configured to confirm a user's identity by using passwords, magnetic cards, or magnetic buckles so as to unlock/authorize access, but the user has to carry and memorize many passwords, magnetic cards, or magnetic buckles, thus being inconvenient. Furthermore, it is unsafe as the passwords, magnetic cards, or magnetic buckles may be lost.

As for capacitive/resistive fingerprinting recognition, three-dimensional image recognition, infrared image recognition, and the biometric fusions of at least two biometric, it is important for a security system to distinguish fake images and voice replications. Nevertheless, distinguishing fake images and voice replications is executed by using extra hardware equipment and strong calculation.

The present invention has arisen to mitigate and/or obviate the afore-described disadvantages.

SUMMARY OF THE INVENTION

The primary objective of the present invention is to provide a biometric fusion electronic lock system which is locked and unlocked by using biometric fusion of face recognition and voiceprint identification.

DETAILED DESCRIPTION OF THE PREFERRED EMBODIMENTS

Figure 1:
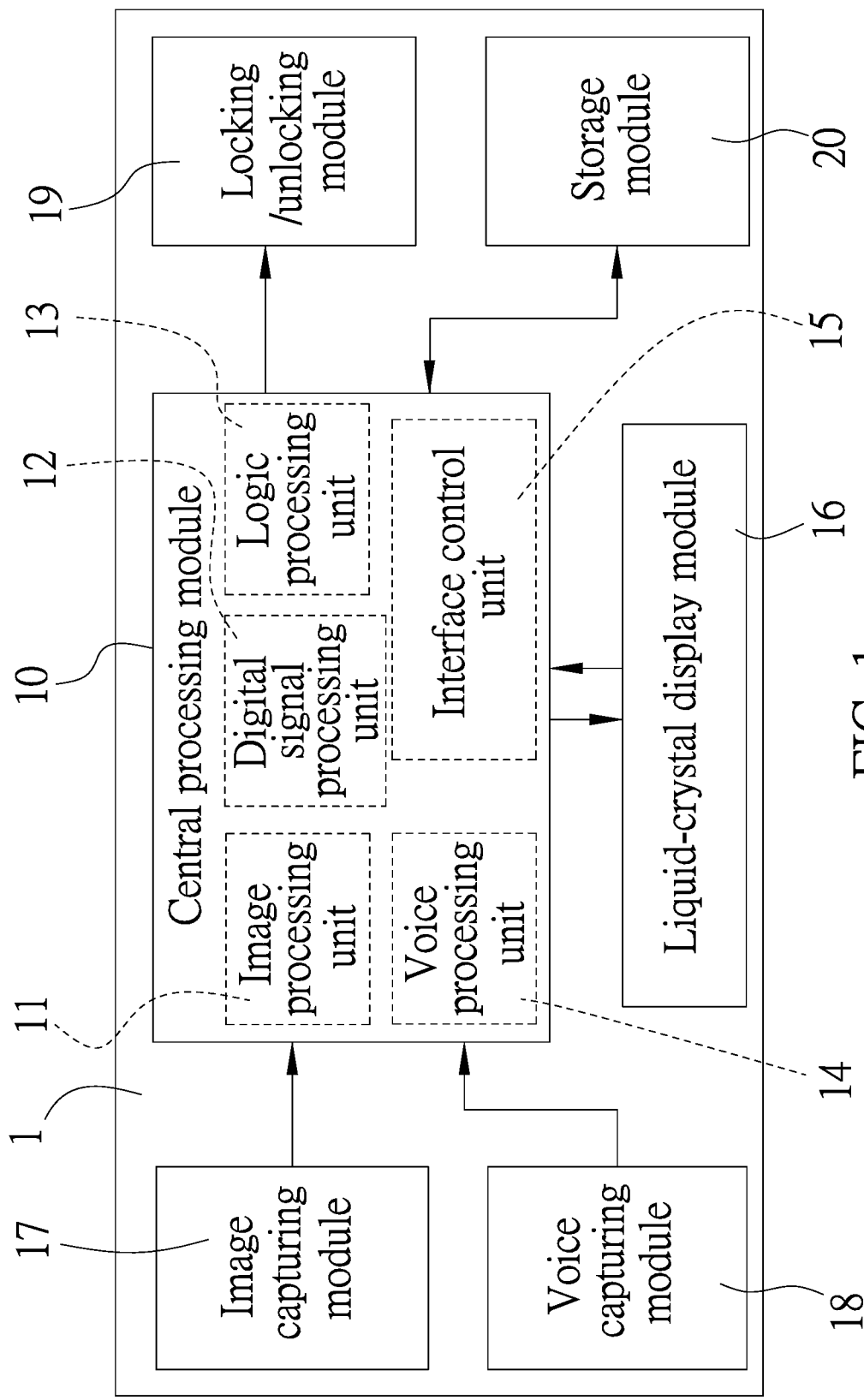
FIG. 1 is a block diagram of a biometric fusion electronic lock system according to a preferred embodiment of the present invention.

The present invention will be clearer from the following description when viewed together with the accompanying drawings, which show, for purpose of illustrations only, a preferred embodiment in accordance with the present invention.

To overcome the above-mentioned problems, biometric fusion is applicable for access control and identity verification system, such as fingerprint identification, iris recognition, face recognition, and voice recognition so as to distinguish biometric fusions of various users, thus having identity verification and control and avoiding the danger of losing the magnetic cards, magnetic buckles, and passwords. However, the biometric fusion is applied based on a two-dimensional image, voice capture and recognition, so it is easy to copy the two-dimensional image and the voice.

With reference to FIGS. 1-4, a biometric fusion electronic lock system 1 according to a preferred embodiment of the present invention includes a central processing module 10 including an image processing unit 11, a voice processing unit 14, a digital signal processing unit 12, a logic processing unit 13, and an interface control unit 15.

The image processing unit 11 is configured to filter background image interference, normalize images, and balance brightness distribution so as to enhance correct rate of face recognition.

The voice processing unit 14 is configured to filter background noise interference and to normalize the voice and voice speed so as to enhance the correct rate of voiceprint recognition and voice command recognition.

The digital processing unit 12 is configured to calculate facial feature recognition, facial expression recognition, voiceprint command identification, and voice command recognition so as to capture facial features and at least one facial expression sequence by which the logic processing unit 13 distinguishes a user's identity in a first step, and the digital processing unit 12 captures a user's voiceprints and voice commands so that the logic processing unit 13 distinguishes the user's identity and the voice commands.

The logic processing unit 13 is configured to logically judge the identification result, control locking and unlocking modules of a door by using the interface control unit 15, and select a legal user by comparing with a facial images database set according to the facial features captured by the digital processing unit 12.

The interface control unit 15 is configured to drive a locking latchbolt 191 to lock or unlock the electronic lock system 1 by a DC motor set.

An image capturing module 17 is electrically connected with the central processing module 10, and a voice capturing module 18 is electrically connected with the central processing module 10.

A locking/unlocking module 19 is configured to drive the locking latchbolt 191 to lock or unlock the electronic lock system, the locking/unlocking module 19 being electrically connected with the central processing module 10.

A storage module 20 is set in a storage media so as to store the facial features and voiceprint data captured by the image capturing module 17 and the voice capturing module 18 respectively, and a liquid-crystal display (LCD) module 16 is electrically connected with the interface control unit 15 of the central processing module 10.

Figure 2:
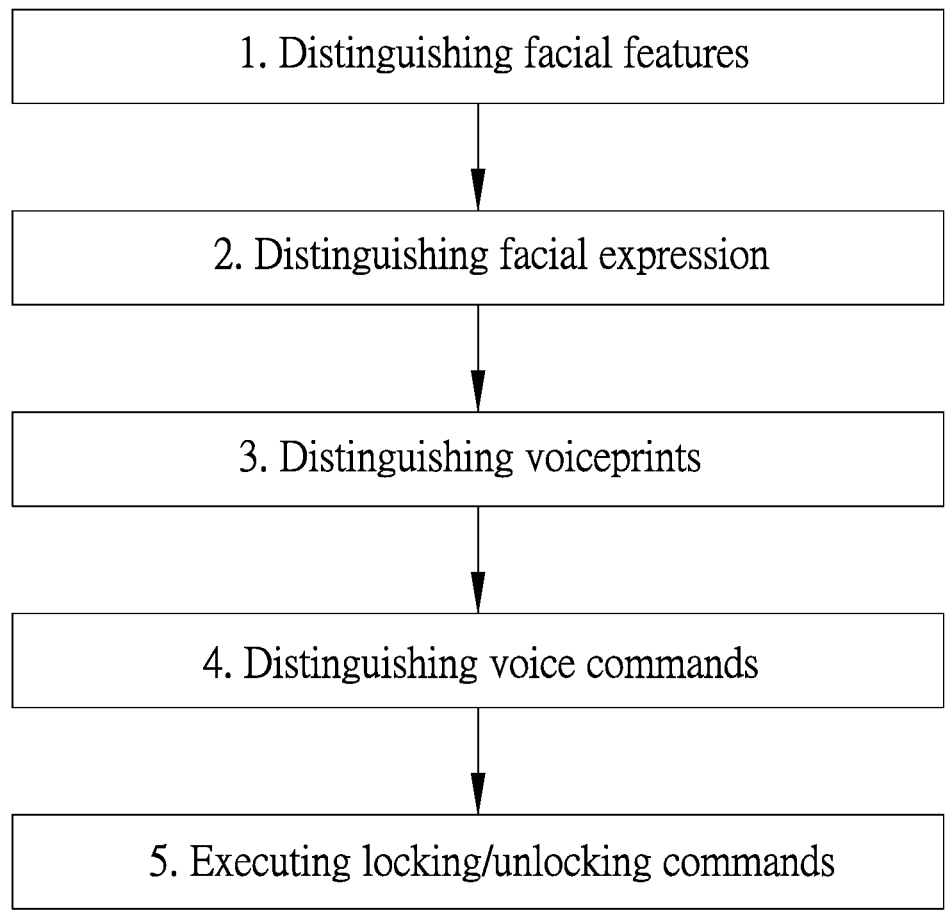
FIG. 2 is a flow chart showing the application of the biometric fusion electronic lock system according to the preferred embodiment of the present invention.

Referring to FIG. 2, the image capturing module 17 is a camera configured to capture the images so as to distinguish the facial features and the facial expressions by using a vector graphics program, with the facial features compared and distinguished by way of principal component analysis (PCA) or linear discriminant analysis (LDA), and the facial expressions compared and distinguished by using project oxford emotion application programming interface (API) of emotion analysis database. The facial features and the facial expressions are compared and distinguished simultaneously, and the logic processing unit 13 logically distinguishes the images by way of image input equipment. Then, the digital signal processing unit 12 captures the facial features and compares the facial features with the facial image database so as to select the legal user. Thereafter, the legal user is compared with expression sequence of a predetermined user so as to judge whether the voice capturing module 18 is then used to distinguish the legal user.

The voice capturing module 18 is a microphone which includes voice input equipment of voice command recognition and voice command recognition. The user's voiceprints and the voice commands are captured by the digital signal processing unit 12, and the logic processing unit 13 distinguishes the user's identity and control commands, such that the interface control unit 15 locks or unlocks the locking/unlocking module 19 of the electronic lock system 1 by using the interface control unit 15, wherein the voiceprint recognition and the voice command recognition are executed simultaneously.

Figure 3:
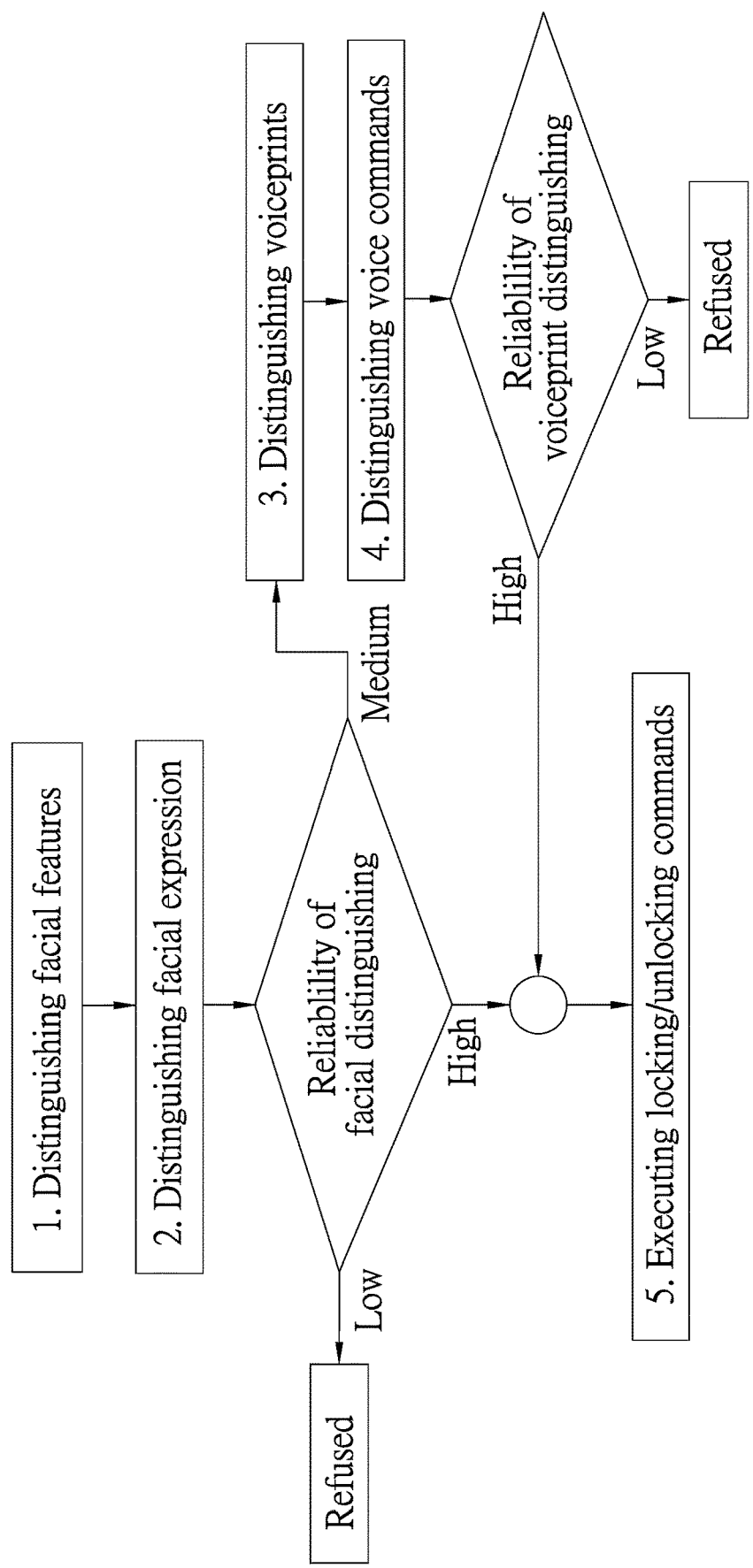
FIG. 3 is a flow chart showing the application of a biometric fusion electronic lock system according to another preferred embodiment of the present invention.

In another embodiment, as shown in FIG. 3, the image capturing module 17 distinguishes the facial features and facial expressions, and when a reliability of the face recognition is low, the electronic lock system refuses to execute, when the reliability of the face recognition is high, the interface control unit 15 locks or unlocks the locking/unlocking module 19 of the electronic lock system 1, and when the reliability of the face recognition is medium, the voice capturing module 18 starts so as to distinguish voiceprints and to input voice commands, and the logic processing unit 13 distinguish a user's identity and control commands. When the reliability of the voice recognition is high, the interface control unit 15 locks or unlocks the locking/unlocking module 19 of the electronic lock system 1, and when a reliability of the voice recognition is low, the electronic lock system refuses to execute.

The logic processing unit 13 and the storage module 20 are mounted on a controlling device.

Figure 4:
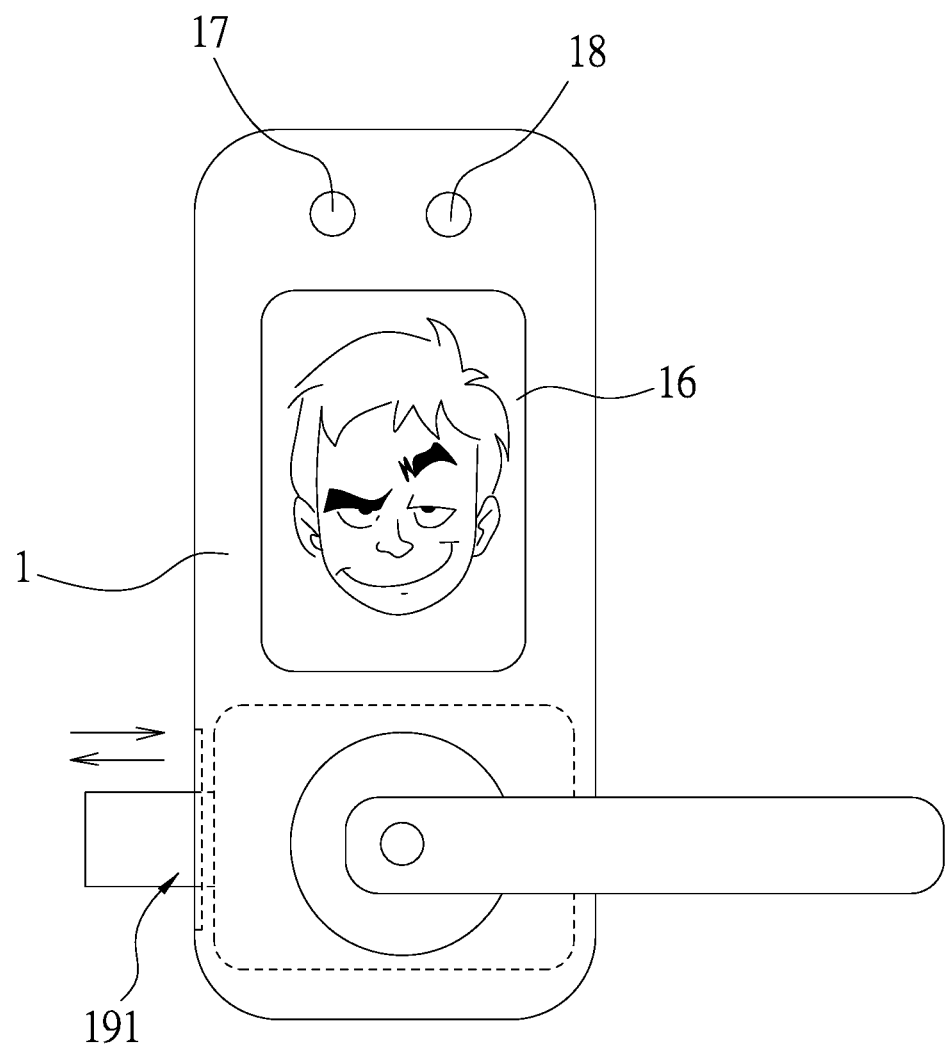
FIG. 4 is a side plan view showing the application of the biometric fusion electronic lock system according to the preferred embodiment of the present invention.

As shown in FIG. 4, the electronic lock system 1 includes an image capturing module 17 which is a camera, a voice capturing module 18 which is a microphone, and a liquid-crystal display (LCD) module 16 having human machine interface.

Thereby, the electronic lock system distinguishes the facial features, the facial expressions, voice commands, and voiceprints so as to enhance anti-theft function.

While various embodiments in accordance with the present invention have been shown and described, it is clear to those skilled in the art that further embodiments may be made without departing from the scope of the present invention.

What is claimed is:

1. A biometric fusion electronic lock system comprising:
a central processing module including an image processing unit, a voice processing unit, a digital signal processing unit, a logic processing unit, and an interface control unit;
an image capturing module electrically connected with the central processing module;
a voice capturing module electrically connected with the central processing module;
a locking/unlocking module configured to drive a locking latchbolt to lock or unlock the electronic lock system, and the locking/unlocking module being electrically connected with the central processing module;
a storage module, set in a storage media of the electronic lock system, configured to store facial features and voiceprint data captured by the image capturing module and the voice capturing module respectively; and
a liquid-crystal display (LCD) module electrically connected with the interface control unit of the central processing module,
wherein the image capturing module is a camera configured to capture images so as to distinguish facial features and facial expressions by using a vector graphics program, wherein the facial features are compared and distinguished by way of principal component analysis (PCA) or linear discriminant analysis (LDA), and the facial expressions are compared and distinguished by using project oxford emotion application programming interface (API) of an emotion analysis database, wherein the facial features and the facial expressions are compared and distinguished simultaneously, and
wherein the logic processing unit logically distinguishes the images by way of image input equipment, then the digital signal processing unit captures the facial features and compares the facial features with a facial image database so as to select a corresponding user, and thereafter the selected user is compared with a predetermined expression sequence of the selected user and a determination as to a reliability of facial recognition is made based upon the comparison,
wherein upon a determination that the reliability is high, the interface control unit locks/unlocks the electronic lock system,
wherein upon a determination that the reliability is low, the electronic lock system remains locked, and
wherein upon a determination that the reliability is medium, the voice capturing module is activated to distinguish voiceprints.

2. The biometric fusion electronic lock system as claimed in claim 1, wherein the voice capturing module comprises a microphone with voice input equipment including voiceprint recognition and voice command recognition, and wherein the selected user's voiceprints and voice commands are captured by the digital signal processing unit, and the logic processing unit distinguishes the selected user's identity and control commands, such that the interface control unit locks or unlocks the locking/unlocking module of the electronic lock system by using the interface control unit, and wherein the voiceprint recognition and the voice command recognition are executed simultaneously.

* * * * *